(12) United States Patent
Dou et al.

(10) Patent No.: US 11,715,234 B2
(45) Date of Patent: Aug. 1, 2023

(54) IMAGE ACQUISITION METHOD, IMAGE ACQUISITION DEVICE, AND STORAGE MEDIUM

(71) Applicant: BEIJING XIAOMI MOBILE SOFTWARE CO., LTD., Beijing (CN)

(72) Inventors: Zifei Dou, Beijing (CN); Chong Guo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 61 days.

(21) Appl. No.: 16/901,731

(22) Filed: Jun. 15, 2020

(65) Prior Publication Data

US 2021/0209796 A1    Jul. 8, 2021

(30) Foreign Application Priority Data

Jan. 6, 2020    (CN) .......................... 202010009870.0

(51) Int. Cl.
    *G06T 7/73*      (2017.01)
    *G06F 3/01*      (2006.01)
    *G06F 3/16*      (2006.01)
    *H04N 23/667*    (2023.01)

(52) U.S. Cl.
    CPC ............... *G06T 7/75* (2017.01); *G06F 3/013* (2013.01); *G06F 3/167* (2013.01); *H04N 23/667* (2023.01)

(58) Field of Classification Search
    CPC ........... G06T 7/75; G06F 3/013; G06F 3/167; H04N 5/23245
    USPC ....................................................... 382/103
    See application file for complete search history.

(56) References Cited

U.S. PATENT DOCUMENTS

| | | | |
|---|---|---|---|
| 6,301,440 B1* | 10/2001 | Bolle | H04N 5/23222 396/128 |
| 9,794,475 B1* | 10/2017 | Tome | H04N 5/232 |
| 10,521,671 B2* | 12/2019 | Chang | H04N 21/23418 |
| 2005/0185052 A1* | 8/2005 | Raisinghani | H04N 7/183 348/148 |
| 2006/0204034 A1* | 9/2006 | Steinberg | G06V 10/10 382/118 |
| 2008/0239104 A1* | 10/2008 | Koh | H04N 5/23222 348/240.99 |
| 2009/0103778 A1* | 4/2009 | Yoshizumi | H04N 5/23218 382/103 |

(Continued)

FOREIGN PATENT DOCUMENTS

| | | |
|---|---|---|
| CN | 103442175 A | 12/2013 |
| CN | 105872388 A | 8/2016 |

(Continued)

OTHER PUBLICATIONS

Extended European Search Report in the European Application No. 20181078.5, dated Dec. 18, 2020, (12p).

(Continued)

*Primary Examiner* — Stephen S Hong
*Assistant Examiner* — Broderick C Anderson
(74) *Attorney, Agent, or Firm* — Arch & Lake LLP

(57) ABSTRACT

An image acquisition method, an image acquisition device and a storage medium are provided. The method includes: acquiring a preview image collected by a camera; detecting a target area in the preview image based on a preset composition model; and in response to detecting the target area, acquiring an image including the target area as a target image.

20 Claims, 7 Drawing Sheets

Acquire a preview image collected by an instruction camera in the electronic device — 51

Acquire postures of a photographer in the preview image collected by the instruction camera — 52

In response to that the postures of the photographer include preset postures, perform the step of detecting the target area in the preview image based on the preset composition model — 53

(56) References Cited

U.S. PATENT DOCUMENTS

| | | | |
|---|---|---|---|
| 2010/0129051 A1* | 5/2010 | Lee | H04N 21/42661 386/343 |
| 2012/0014659 A1 | 1/2012 | Hugosson | |
| 2012/0062720 A1 | 3/2012 | Choi et al. | |
| 2015/0350505 A1* | 12/2015 | Malkin | G03B 17/00 348/357 |
| 2016/0188980 A1 | 6/2016 | Martin | |
| 2017/0310888 A1* | 10/2017 | Wright | G06F 3/04817 |
| 2018/0211447 A1* | 7/2018 | Spayd | G09B 5/065 |
| 2019/0174056 A1* | 6/2019 | Jung | G06N 3/084 |
| 2019/0179418 A1* | 6/2019 | Marggraff | G06F 3/013 |
| 2019/0236393 A1 | 8/2019 | Wang | |
| 2019/0253615 A1 | 8/2019 | Fukuya et al. | |
| 2019/0379822 A1* | 12/2019 | Leong | G11B 27/031 |
| 2020/0204738 A1* | 6/2020 | Peng | H04N 5/23218 |

FOREIGN PATENT DOCUMENTS

| | | |
|---|---|---|
| CN | 107257439 A | 10/2017 |
| CN | 108737715 A | 11/2018 |
| CN | 109858539 A | 6/2019 |
| CN | 110476405 A | 11/2019 |
| EP | 2381390 A2 | 10/2011 |
| EP | 2407943 A1 | 1/2012 |
| GB | 2448221 A | 10/2008 |
| KR | 20190105533 A | 9/2019 |
| WO | 2019020052 A1 | 1/2019 |

OTHER PUBLICATIONS

Partial European Search Report in the European Application No. 20181078.5, dated Aug. 19, 2020, (12p).
First Office Action of the Chinese Application No. 202010009870.0, dated Mar. 28, 2022 with English translation, (20p).
Second Office Action of the Chinese Application No. 202010009870.0, dated Oct. 31, 2022, with English transaltion, (21 p).
First Office Action of the Eurpean Application No. 20181078.5, dated Nov. 3, 2022, (5p).

* cited by examiner

IMAGE ACQUISITION METHOD, IMAGE ACQUISITION DEVICE, AND STORAGE MEDIUM

CROSS-REFERENCE TO RELATED APPLICATION

This application claims priority to Chinese Patent Application No. 202010009870.0, filed on Jan. 6, 2020, the entire contents of which are incorporated herein by reference.

BACKGROUND

At present, the user interface of the camera App of an electronic device always simulates the style of the User Interface (UI) of a professional single-lens reflex (SLR) camera. A plurality of icons, such as a light key, a camera switching key, a setting key, a photographing key and a photographing mode key, are set in the UI. Thus, a user can directly select a required key to execute a corresponding operation to achieve the effect of quickly taking a photograph or recording a video.

However, with the increase of icons in the UI, the difficulty of design is increased. Furthermore, due to intricate icon settings, the photographing difficulty and learning cost of the user are increased, and the use experience is reduced.

SUMMARY

The disclosure relates to the field of a control technology, and particularly relates to an image acquisition method, an image acquisition device and a storage medium.

According to a first aspect of the disclosure, an image acquisition method is provided. The image acquisition method is applied to an electronic device provided with a camera. The method includes: a preview image collected by the camera is acquired; a target area in the preview image is detected based on a preset composition model; and in response to detecting the target area, an image including the target area is acquired as a target image.

According to a second aspect of the disclosure, an electronic device is provided. The electronic device may include: a processor; and a memory for storing executable instructions of the processor, wherein the processor is configured to execute the executable instructions in the memory to implement the steps of any one of the above methods.

According to a third aspect of the disclosure, a non-transitory storage medium having stored therein instructions is provided, wherein when the executable instructions are executed by the processor, the steps of any one of the above methods are implemented.

It should be understood that the above general description and the following detailed description are exemplary and explanatory only, and are not intended to limit the disclosure.

BRIEF DESCRIPTION OF THE DRAWINGS

The drawings herein, which are incorporated in and constitute a part of the specification, illustrate embodiments consistent with the disclosure, and explain the principles of the disclosure together with the specification.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Rather, they are merely examples of apparatuses and methods consistent with some aspects of the disclosure as detailed in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if"

may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Figure 1:
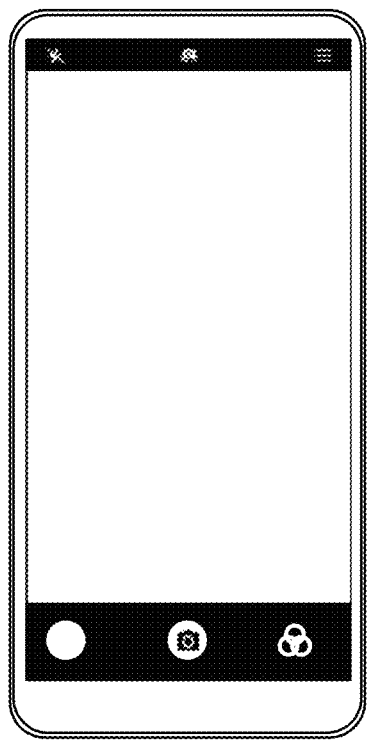
FIG. 1 is a schematic diagram of a user interface in a related technology.

At present, the user interface of the camera App of an electronic device always simulates the style of the User Interface (UI) of a professional SLR camera. A plurality of icons, such as a light key, a camera switching key, a setting key, a photographing key and a photographing mode key, are set in the UI, and the effect is as shown in FIG. 1. Thus, a user can directly select a required key to execute a corresponding operation to achieve the effect of quickly taking a photograph or recording a video.

However, with the increase of icons in the UI, the difficulty of design is increased. Furthermore, due to intricate icon settings, the photographing difficulty and learning cost of the user are increased, and the use experience is reduced.

Figure 2:
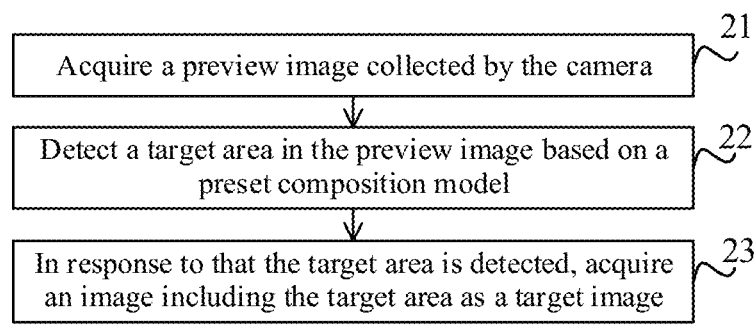
FIG. 2 is a flow diagram of an image acquisition method according to at least some embodiments.

In order to solve the above technical problems, the embodiments of the disclosure provide an image acquisition method which may be applied to an electronic device provided with a camera, such as a smart phone and a tablet computer. FIG. 2 is a flow diagram of an image acquisition method according to at least some embodiments. Referring to FIG. 2, the image acquisition method includes steps 21 to 23.

In step 21, a preview image collected by the camera is acquired.

In one or more embodiments, the camera is disposed in the electronic device, and the camera may include one or more of a front camera, a rear camera and a 3D camera (such as a TOF camera). Considering the role played by the camera, in one or more embodiments, the camera may be divided into: a, a camera configured to collect a preview image or photograph an image; and b, a camera configured to collect a preview image or a preview video stream, wherein the preview image is configured to acquire postures of a photographer, and the preview video stream is configured to acquire the eyeball postures of the photographer. For convenience of explanation, the camera applied to the role of (b) is called an instruction camera in subsequent embodiments.

In one or more embodiments, a rear camera is taken as an example. When the camera is started, the camera may collect an image as a preview image, and send the preview image to a display screen for display to the photographer. At the same time, the preview image may also be temporarily stored in a memory.

In one or more embodiments, a processor in the electronic device may communicate with the camera to obtain the collected preview image. Alternately, the processor communicates with the memory to read the preview image stored in the memory.

Figure 3:
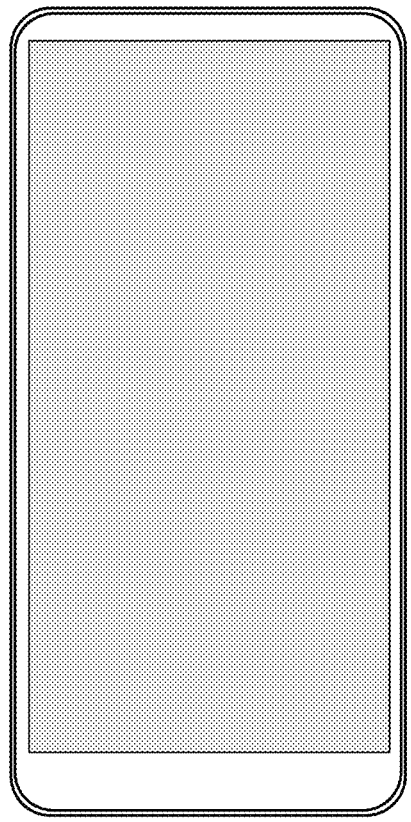
FIG. 3 is a schematic diagram of a preset interface according to at least some embodiments.

In one embodiment, a preset interface may be preset in the electronic device and is hereinafter referred to as a first preset interface to show the difference, no operation key is displayed in the first preset interface, and the effect is as shown in FIG. 3. Thus, the first preset interface may be completely configured to display a preview image. Furthermore, because no operation key is displayed on the display screen at this time, there is no need for the photographer to touch any part of the display screen, the shaking of the electronic device is avoided, and the photographing quality is ensured.

In step 22, a target area in the preview image is detected based on a preset composition model.

In one or more embodiments, the processor may acquire the preset composition model, the acquired preview image is input to the composition model, and the composition model acquires the target area in the preview image. The target area refers to an area focused by the photographer.

The composition model may be acquired by the following modes.

For example, general composition principles in the photography industry or composition principles favored by photographers, such as three-point composition, diagonal composition, S-shaped composition, golden section composition and triangular composition, may be acquired, and then, a composition model may be generated based on the composition principles. The user may select one or more composition principles for each photographing mode so that the electronic device may obtain the composition model based on the selected composition principles for each photographing mode.

For another example, a large number of composition samples may be acquired, the composition samples refer to images photographed by adopting different composition principles respectively, then, an initial composition model (such as a neural network) is trained, and after the composition model converges, a trained composition model is obtained.

It can be understood that if the composition sample is an image provided by the photographer or an image selected by the photographer from candidate samples, the trained composition model may determine the target area that the photographer may pay attention to from the preview image to a certain extent.

In one or more embodiments, after the processor acquires the preview image, the target area in the preview image may be acquired. In another embodiment, the processor may also detect a control instruction after acquiring the preview image, and acquire the target area in the preview image after detecting the control instruction.

Figure 4:
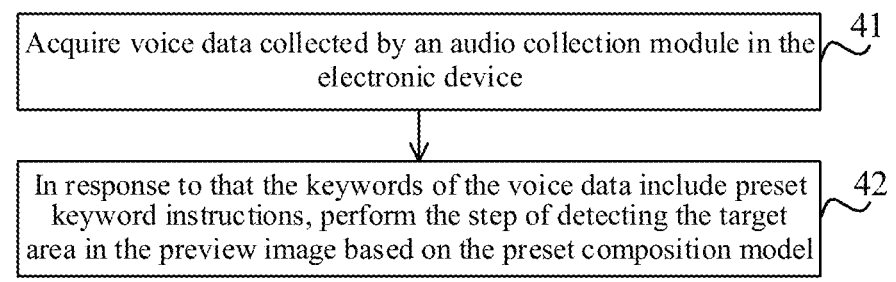
FIG. 4 is a flow diagram of acquiring a target area based on voice data control according to at least some embodiments.

In an example, an audio collector (such as a microphone) is disposed in the electronic device. Before use, the photographer adjusts a photographing mode in the electronic device to an audio control mode. Referring to FIG. 4, in step 41, the processor may acquire the voice data collected by the audio collector in the electronic device. In step 42, the processor may acquire the keywords in the voice data, and execute step 22 in response to that the keywords of the voice data include preset keyword instructions.

The modes of acquiring keywords by the processor may include modes 1 and 2.

In mode 1, the processor may convert the voice data into a text sequence, and the conversion method may refer to related technologies. Then, the acquired text sequence is segmented, and stop words are removed to obtain the keywords contained in the text sequence.

In mode 2, the processor may acquire the frequency or phoneme in the voice data, and when the frequency or phoneme corresponding to the preset keyword instruction is detected, it is determined that the preset keyword instruction is detected.

Figure 5:
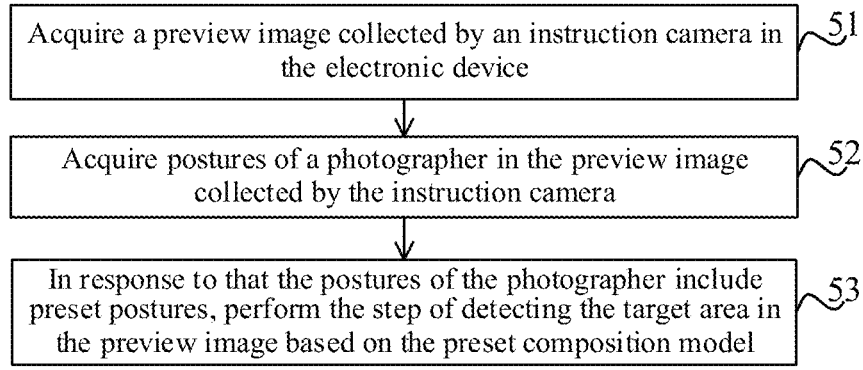
FIG. 5 is a flow diagram of acquiring a target area based on preview image control according to at least some embodiments.

In another example, in a preview process, the electronic device may start an instruction camera. For example, when the photographer uses the rear camera of the electronic device to photograph an image, the front camera may be used as the instruction camera. When the photographer uses the front camera of the electronic device to photograph an image, the TOF camera or the rear camera may be used as the instruction camera. When the photographer uses the front camera to take a selfie, the front camera may be used as the instruction camera. Referring to FIG. 5, in step 51, the processor may acquire the preview image collected by the instruction camera in the electronic device. Acquisition modes may include: the processor directly communicates with the instruction camera, or the processor reads the preview image from a specified position, which is not limited herein. In step 52, the processor may acquire the postures of the photographer in the preview image collected by the instruction camera. In step 53, in response to that the postures of the photographer include preset postures, step 22 is executed.

Figure 6:
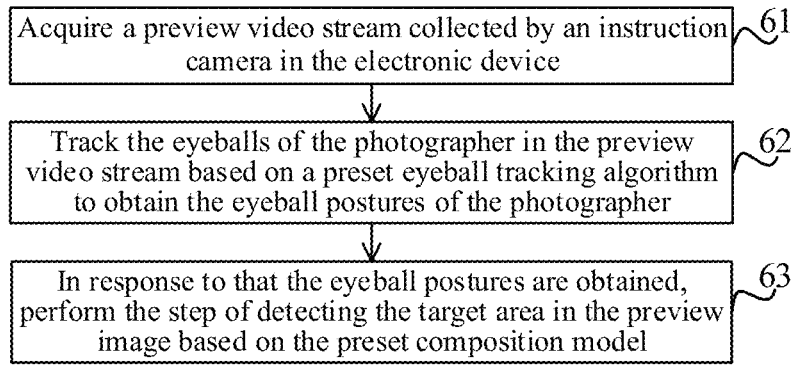
FIG. 6 is a flow diagram of acquiring a target area based on eyeball tracking control according to at least some embodiments.

In another example, in a preview process, the electronic device may start an instruction camera. For example, when the photographer uses the rear camera of the electronic device to photograph an image, the front camera may be used as the instruction camera. When the photographer uses the front camera of the electronic device to photograph an image, the TOF camera or the rear camera may be used as the instruction camera. When the photographer uses the front camera to take a selfie, the front camera may be used as the instruction camera. Referring to FIG. 6, in step 61, the preview video stream collected by the instruction camera in the electronic device is acquired. In step 62, the eyeballs of the photographer in the preview video stream are tracked based on the preset eyeball tracking algorithm to obtain the eyeball postures of the photographer. In step 63, in response to that the eyeball postures are obtained, step 22 is executed.

It is to be noted that in the present example, the preset eyeball tracking algorithm may perform three steps of human face detection, eye ROI interception and eyeball centralized positioning on each frame of image in the preview video stream, and the postures of the eyeballs may be determined according to the position of the center of the eyeball in the multi-frame image. The human face detection, the eye ROI interception and the eyeball centralized positioning may refer to related technologies, and details are not described herein.

Figure 7:
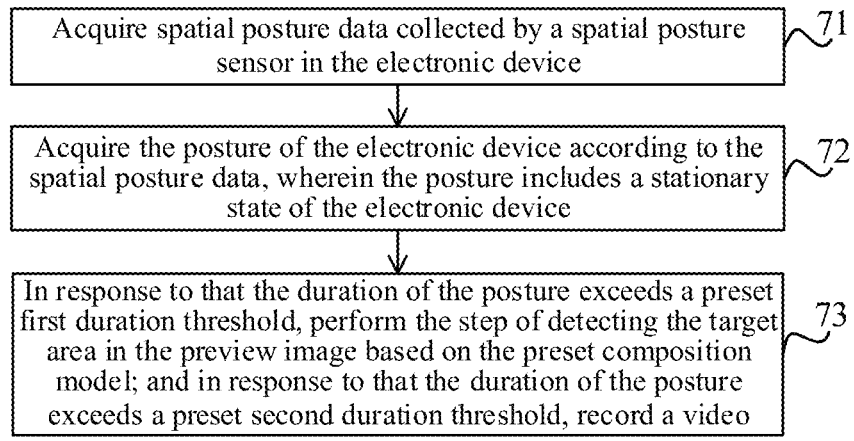
FIG. 7 is a flow diagram of acquiring a target area based on spatial posture data control according to at least some embodiments.

In another example, a spatial posture sensor, such as an acceleration sensor, a gravity sensor and a gyroscope, may be disposed in the electronic device. Referring to FIG. 7, in step 71, the processor may acquire the spatial posture data collected by the spatial posture sensor in the electronic device. In step 72, the posture of the electronic device is acquired according to the spatial posture data, wherein the posture includes a stationary state of the electronic device. In step 73, in response to that the duration of the posture exceeds the preset first duration threshold (such as 200 ms, adjustable), step 22 is executed.

In the present example, the processor may also record a video in response to that the duration of the posture exceeds the preset second duration threshold (such as 2s, adjustable). It can be understood that after the processor determines to record the video, a first video from a time moment of turning on the camera to a time moment of starting to record the video may also be acquired, and then, the first video is added to the recorded video, thereby maintaining the integrity of the recorded video, and being favorable for helping the photographer to capture wonderful scenes.

In one embodiment, the processor may also detect the control instruction characterizing the stop of photographing when detecting a control instruction, at this time, the processor may stop a current photographing and close the first preset interface.

In step 23, in response to detecting the target area, the electronic device acquires an image including the target area as a target image.

In one or more embodiments, the processor may acquire the image including the target area as the target image after detecting the target area. For example, when the number of target areas is one, the processor may crop the image in the target area as the target image according to the set size, and use the entire preview image as the target image. For another example, when there are multiple target areas, the processor crops the preview image according to the respective size of the target area, uses the preview image as a reference template, and crops one target area at a time, so that the obtained target images do not interfere with each other. Of course, it is possible to crop the image while previewing the image at the same time, and obtain multiple target images under the condition that the images of two adjacent target areas do not intersect. Technicians can select suitable solutions for acquiring target images according to specific scenes, which is not limited herein.

Figure 8:
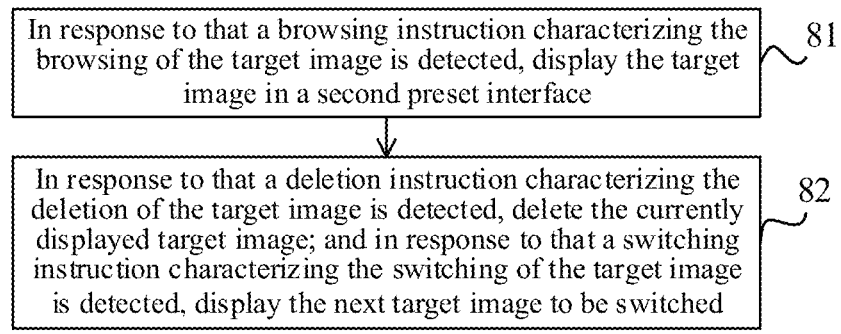
FIG. 8 is a flow diagram of deleting a target image according to at least some embodiments.

In one or more embodiments, considering that multiple target images are obtained after one time of photographing, the photographer may select the target images. The processor may detect a browsing instruction which may include detecting that the photographer triggers an "album" key, or a "browse" key in a camera APP. Referring to FIG. 8, in step 81, in response to that a browsing instruction characterizing the browsing of the target image is detected, the processor may display the target image in the second preset interface. In step 82, in response to that a deletion instruction characterizing the deletion of the target image is detected, the processor may also delete the currently displayed target image. For example, sliding to the left indicates that the photographer likes and saves the currently displayed target image, and the next target image is displayed. For another example, sliding to the right indicates that the photographer dislikes and deletes the currently displayed target image, and the next target image is displayed.

It is to be noted that the processor may acquire the target image saved by the photographer as a new composition sample according to a preset period, or acquire a preset number of target images selected by the photographer as new composition samples. The processor can facilitate the new composition sample to update a composition sample set, and then use the updated composition sample set to train a composition model, so that the target area output by the composition model and the area focused by the photographer may achieve a higher matching accuracy. Finally, the area that the photographer pays attention to is exactly the same as the area where the camera is located, thereby achieving the effect of "man-machine integration".

In the embodiments of the disclosure, the preview image collected by the camera is acquired; then, the target area in the preview image is detected based on the preset composition model; and then, in response to that the target area is detected, the image including the target area is acquired as the target image. Thus, in one or more embodiments, the target area focused by the photographer may be acquired without manual selection by the photographer, so as to improve the photographing experience. Furthermore, in one or more embodiments, the target image may be acquired without operating keys by the photographer, which is simple and fast, and further improves the photographing experience.

Figure 9:
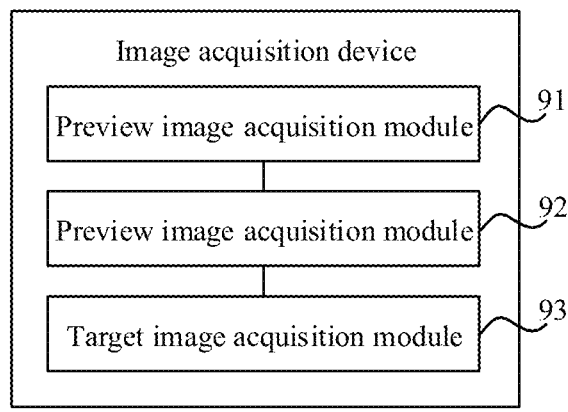
FIG. 9 is a block diagram of an image acquisition device according to at least some embodiments.

On the basis of the above image acquisition method, the embodiments of the disclosure further provide an image acquisition device. FIG. 9 is a block diagram of an image acquisition device according to at least some embodiments. Referring to FIG. 9, an image acquisition device is applied to an electronic device provided with a camera. The device includes:

a preview image acquisition module 91 configured to acquire a preview image collected by the camera;

a preview image acquisition module 92 configured to detect a target area in the preview image based on a preset composition model; and a target image acquisition module 93 configured to acquire an image including the target area as a target image in response to that the target area is detected.

Optionally, the composition model includes at least one of: a composition model formed based on composition principles, and a composition model trained based on preset composition samples.

Figure 10:
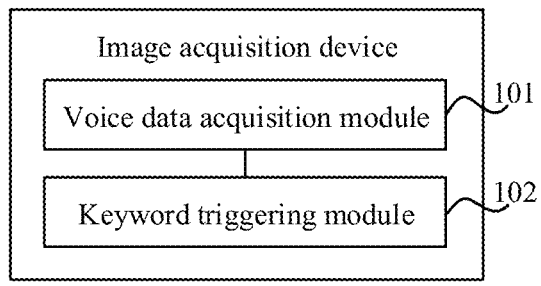
FIG. 10 is a second block diagram of an image acquisition device according to at least some embodiments.

In one embodiment, referring to FIG. 10, the device includes:

a voice data acquisition module 101 configured to acquire voice data collected by an audio collector in the electronic device; and a keyword triggering module 102 configured to trigger the preview image acquisition module in response to that the keywords of the voice data include preset keyword instructions.

Figure 11:
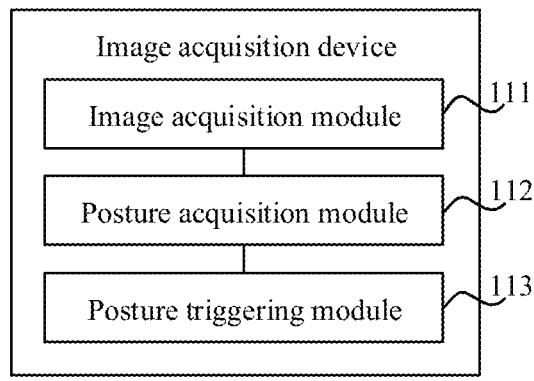
FIG. 11 is a third block diagram of an image acquisition device according to at least some embodiments.

In one embodiment, referring to FIG. 11, the device includes:

an image acquisition module 111 configured to acquire a preview image collected by an instruction camera in the electronic device;

a posture acquisition module 112 configured to acquire postures of a photographer in the preview image collected by the instruction camera; and a posture triggering module 113 configured to trigger the preview image acquisition module in response to that the postures of the photographer include preset postures.

Figure 12:
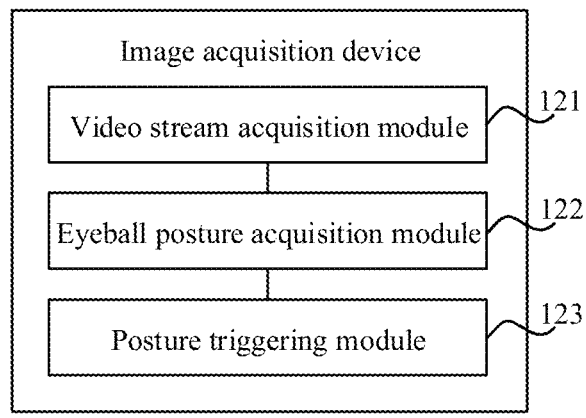
FIG. 12 is a fourth block diagram of an image acquisition device according to at least some embodiments.

In one embodiment, referring to FIG. 12, the device includes:

a video stream acquisition module 121 configured to acquire a preview video stream collected by the instruction camera in the electronic device;

an eyeball posture acquisition module 122 configured to track the eyeballs of the photographer in the preview video stream based on a preset eyeball tracking algorithm to obtain the eyeball postures of the photographer; and a posture triggering module 123 configured to trigger the preview image acquisition module in response to that the eyeball postures are obtained.

Figure 13:
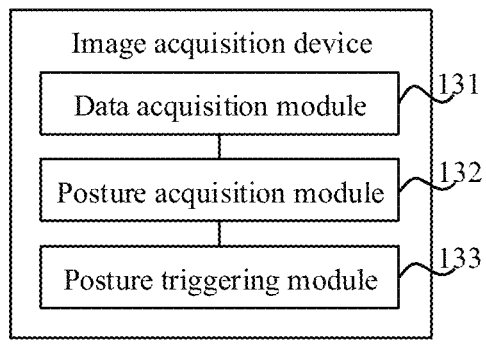
FIG. 13 is a fifth block diagram of an image acquisition device according to at least some embodiments.

In one embodiment, referring to FIG. 13, the device further includes:

a data acquisition module 131 configured to acquire spatial posture data collected by a spatial posture sensor in the electronic device;

a posture acquisition module 132 configured to acquire the posture of the electronic device according to the spatial posture data, wherein the posture includes a stationary state of the electronic device; and a posture triggering module 133 configured to trigger the preview image acquisition module in response to that the duration of the posture exceeds a preset first duration threshold, and record a video in response to that the duration of the posture exceeds a preset second duration threshold.

Figure 14:
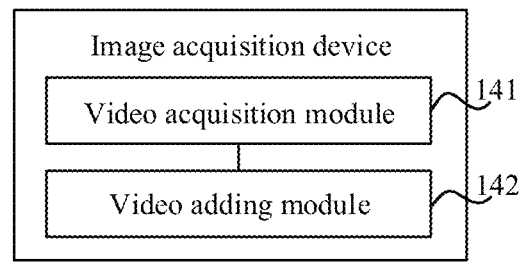
FIG. 14 is a sixth block diagram of an image acquisition device according to at least some embodiments.

In one embodiment, referring to FIG. 14, the device further includes:

a video acquisition module 141 configured to acquire a first video from a time moment of turning on the camera to a time moment of starting to record the video; and a video adding module 142 configured to add the first video to the recorded video.

In one embodiment, the device may further include:

a preset interface showing module configured to present a first preset interface for displaying the preview image in response to that a starting operation of the camera is detected, wherein no operation key is displayed in the first preset interface.

Figure 15:
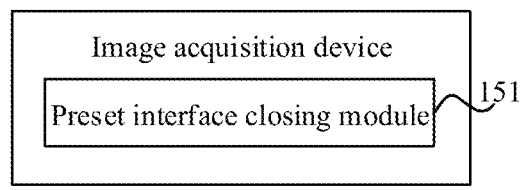
FIG. 15 is a seventh block diagram of an image acquisition device according to at least some embodiments.

In one embodiment, referring to FIG. 15, the device further includes:

a preset interface closing module 151 configured to stop a current photographing and close the first preset interface in response to that a control instruction characterizing the stop of photographing is detected.

Figure 16:
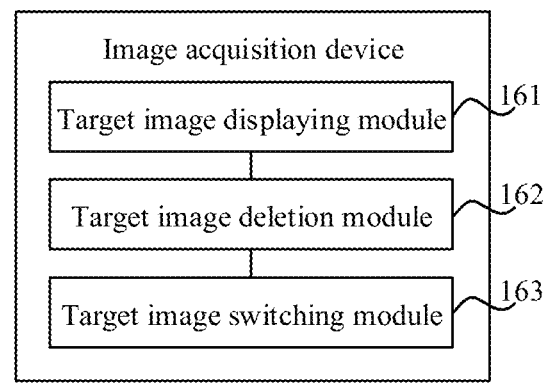
FIG. 16 is an eighth block diagram of an image acquisition device according to at least some embodiments.

In one embodiment, referring to FIG. 16, the device further includes:

a target image displaying module 161 configured to display the target image in a second preset interface in response to that a browsing instruction characterizing the browsing of the target image is detected;

a target image deletion module 162 configured to delete the currently displayed target image in response to that a deletion instruction characterizing the deletion of the target image is detected; and a target image switching module 163 configured to display the next target image to be switched in response to that a switching instruction characterizing the switching of the target image is detected.

It can be understood that the device provided by the embodiments of the disclosure corresponds to the contents of the methods in the above embodiments, specific contents may refer to the contents of the method in each embodiment, and the details are not described herein.

In the embodiments of the disclosure, the preview image collected by the camera is acquired; then, the target area in the preview image is detected based on the preset composition model; and then, in response to that the target area is detected, the image including the target area is acquired as the target image. Thus, in one or more embodiments, the target area focused by the photographer may be acquired without manual selection by the photographer, so as to improve the photographing experience. Furthermore, in one or more embodiments, the target image may be acquired without operating keys by the photographer, which is simple and fast, and further improves the photographing experience.

Figure 17:
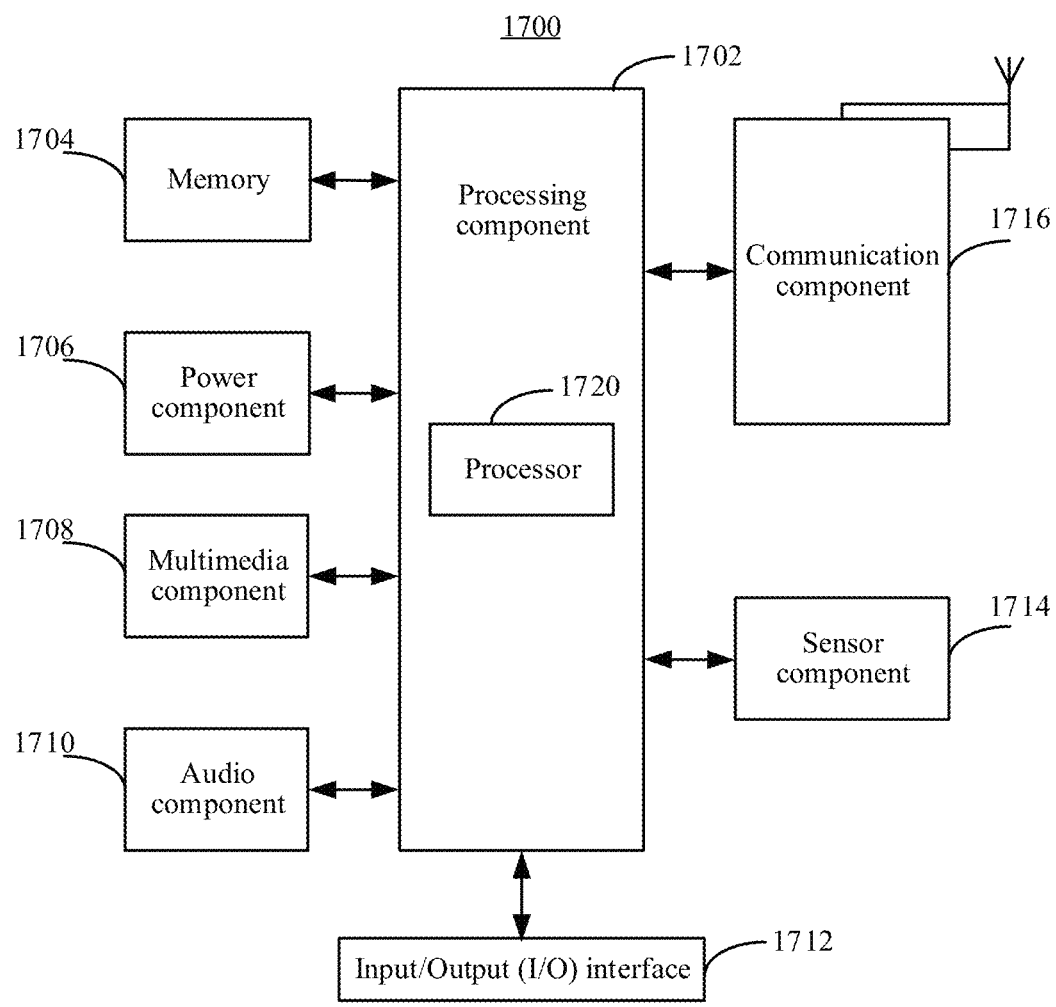
FIG. 17 is a schematic diagram illustrating an electronic device, according to at least some embodiments.

FIG. 17 is a schematic diagram illustrating an electronic device, according to at least some embodiments. For example, an electronic device 1700 may be a smart phone, a computer, a digital broadcast terminal, a tablet device, a medical device, a fitness device, a personal digital assistant, etc. including a transmitting coil, a first magnetic sensor and a second magnetic sensor in an image acquisition device.

Referring to FIG. 17, the electronic device 1700 may include one or more of the following components: a processing component 1702, a memory 1704, a power component 1706, a multimedia component 1708, an audio component 1710, an Input/Output (I/O) interface 1712, a sensor component 1714, a communication component 1716, and an image collection component 17117.

The processing component 1702 typically overall operations of the electronic device 1700, such as operations associated with display, telephone calls, data communications, camera operations, and recording operations. The processing component 1702 may include one or more processors 1720 to execute instructions. In addition, the processing component 1702 may include one or more modules to facilitate the interaction between the processing component 1702 and other components.

The memory 1704 is configured to store various types of data to support the operation of the electronic device 1700. Examples of such data include instructions for any applications or methods operated on the electronic device 1700, contact data, phonebook data, messages, pictures, video, etc. The memory 1704 may be implemented by any type of volatile or non-volatile storage devices or a combination thereof, such as Static Random Access Memory (SRAM), an Electrically Erasable Programmable Read-Only Memory (EEPROM), a Programming Read-Only Memory (EPROM), a Programmable Read-Only Memory (PROM), a Read-Only Memory (ROM), a magnetic memory, a flash memory, a magnetic disk or an optical disk.

The power component 1706 provides power to various components of the electronic device 1700. The power component 1706 may include a power management system, one or more power sources, and any other components associated with the generation, management and distribution of power in the electronic device 1700.

The multimedia component 1708 includes a screen providing an output interface between the electronic device 1700 and the object. In some embodiments, the screen may include an LCD and a TP. If it includes the TP, the screen may be implemented as a touch screen to receive an input signal from an object. The TP includes one or more touch sensors to sense touch, swipe, and gestures on the TP. The touch sensor may not only sense a boundary of a touch or swipe action, but also detect duration and pressure related to the touch or swipe operation.

The audio component 1710 is configured to output and/or input audio signals. For example, the audio component 1710 includes a Microphone (MIC) configured to receive an external audio signal when the electronic device 1700 is in an operation mode, such as a call mode, a recording mode, and a voice recognition mode. The received audio signals may be further stored in the memory 1704 or transmitted via the communication component 1716. In some embodiments, the audio component 1710 may further include a speaker to output audio signals.

The I/O interface 1712 provides an interface between the processing component 1702 and a peripheral interface module. The peripheral interface module may be a keyboard, a click wheel, a button, and the like.

The sensor component 1714 includes one or more sensors to provide status assessments of various aspects of the electronic device 1700. For example, the sensor component 1714 may detect an open/closed status of the electronic device 1700, and relative positioning of components. For example, the component is the display and the keypad of the electronic device 1700. The sensor component 1714 may also detect a change in position of the electronic device 1700 or a component of the, a presence or absence of object contact with the electronic device 1700, an orientation or an acceleration/deceleration of the electronic device 1700, and a change in temperature of the electronic device 1700.

The communication component 1716 is configured to facilitate communication, wired or wirelessly, between the electronic device 1700 and other devices. The electronic device 1700 may access a wireless network based on a communication standard, such as WiFi, 2G, or 3G, or a combination thereof. In one exemplary embodiment, the communication component 1716 receives broadcast signals or broadcast related information from an external broadcast management system via a broadcast channel. In one exemplary embodiment, the communication component 1716 further includes an NFC module to facilitate short-range communications. For example, the NFC module may be implemented based on a Radio Frequency Identification (RFID) technology, an Infrared Data Association (IrDA), an Ultra-Wide Band (UWB) technology, a Bluetooth (BT) technology and other technologies.

In exemplary embodiments, the electronic device 1700 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements.

In exemplary embodiments, there is also provided an executable instruction non-transitory computer-readable storage medium executable instruction including instructions, such as included in the memory 1704, executable by the processor in the electronic device 600. For wherein the, the computer-readable storage medium may be a Read-Only Memory (ROM), a Random Access Memory (RAM), a Compact Disc Read-Only Memory (CD-ROM), a magnetic tape, a floppy disk, an optical data storage device, and the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the apparatus or system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other embodiments of the disclosure will be apparent to those skilled in the art from consideration of the specification and practice of the technical solution disclosed here. The disclosure is intended to cover any variations, uses, or adaptive changes of the disclosure. These variations, uses, or adaptive changes follow the general principles of the disclosure and include common general knowledge or conventional technical means in the technical field, which are not disclosed herein. The specification and the embodiments are considered as being exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure is limited only by the appended claims.

What is claimed is:

1. An image acquisition method, the method comprising:
acquiring, by an electronic device comprising a camera, a preview image collected by the camera;
detecting, by the electronic device, a target area in the preview image based on a preset composition model, wherein the target area is an area focused by a photographer and the target area is smaller than the preview image; and
in response to detecting the target area, acquiring, by the electronic device, an image comprising only the target area as a target image;
wherein the method further comprises:
before detecting the target area in the preview image based on the preset composition model, acquiring spatial posture data collected by a spatial posture sensor in the electronic device;
acquiring posture of the electronic device according to the spatial posture data, wherein the posture comprises a stationary state of the electronic device;
in response to determining that duration of the posture exceeds a preset first duration threshold, executing the step of detecting the target area in the preview image based on the preset composition model; and
in response to determining that the duration of the posture exceeds a preset second duration threshold, recording a video.

2. The image acquisition method of claim 1, further comprising: obtaining the preset composition model by performing at least one of following acts:
forming the preset composition model based on composition principles; and
training the preset composition model based on preset composition samples.

3. The image acquisition method of claim 1, further comprising:
before detecting the target area in the preview image based on the preset composition model, acquiring voice data collected by an audio collector in the electronic device; and
in response to determining that keywords of the voice data comprise preset keyword instructions, performing the step of detecting the target area in the preview image based on the preset composition model.

4. The image acquisition method of claim 1, further comprising:
before detecting the target area in the preview image based on the preset composition model, acquiring a preview image collected by an instruction camera in the electronic device;
acquiring postures of a photographer in the preview image collected by the instruction camera; and
in response to determining that the postures of the photographer comprise preset postures, performing the step of detecting the target area in the preview image based on the preset composition model.

5. The image acquisition method of claim 1, further comprising:
before detecting the target area in the preview image based on the preset composition model, acquiring a preview video stream collected by the instruction camera in the electronic device;
tracking the eyeballs of the photographer in the preview video stream based on a preset eyeball tracking algorithm to obtain the eyeball postures of the photographer; and
in response to obtaining the eyeball postures, executing the step of detecting the target area in the preview image based on the preset composition model.

6. The image acquisition method of claim 1, further comprising:
after recording the video and before storing the recorded video, acquiring a first video from a time moment of turning on the camera to a time moment of starting to record the video; and
adding the first video to the recorded video.

7. The image acquisition method of claim 1, further comprising:
in response to detecting a starting operation of the camera, presenting a first preset interface configured to display the preview image, wherein no operation key is displayed in the first preset interface.

8. The image acquisition method of claim 7, further comprising:
after acquiring the image comprising the target area as the target image, in response to detecting a control instruction characterizing the stop of photographing, stopping a current photographing and closing the first preset interface.

9. The image acquisition method of claim 1, further comprising:
after acquiring the image comprising the target area as the target image, in response to detecting a browsing instruction characterizing the browsing of the target image, displaying the target image in a second preset interface;
in response to detecting a deletion instruction characterizing the deletion of the target image, deleting the currently displayed target image; and
in response to detecting a switching instruction characterizing the switching of the target image, displaying the next target image to be switched.

10. An image acquisition device, comprising:
a camera in communication with a processor; and
a memory for storing executable instructions of the processor, wherein
the processor is configured to execute the executable instructions in the memory to:
acquire a preview image collected by the camera;
detect a target area in the preview image based on a preset composition model, wherein the target area is an area focused by a photographer and the target area is smaller than the preview image; and
acquire an image comprising only the target area as a target image in response to detecting the target area;
wherein the processor is further configured to:
before detecting the target area in the preview image based on the preset composition model, acquire spatial posture data collected by a spatial posture sensor in the electronic device;
acquire posture of the electronic device according to the spatial posture data, wherein the posture comprises a stationary state of the electronic device; and
trigger the preview image acquisition in response to determining that the duration of the posture exceeds a preset first duration threshold, and record a video in response to determining that the duration of the posture exceeds a preset second duration threshold.

11. The method of claim 1, wherein the camera comprises a rear camera and a front camera;
   in response to the rear camera of the electronic device is used for photographing the image, the front camera is used as an instruction camera; and
   in response to the front camera of the electronic device is used for photographing the image, the rear camera is used as an instruction camera.

12. The method of claim 1, wherein in response to that there are a plurality of target areas, the method further comprises:
   cropping the preview image according to a respective size of each target area; and
   obtaining a plurality of target images by cropping one target area at a time by using the preview image as a reference template.

13. The image acquisition device of claim 10, wherein the processor is further configured to:
   acquire a first video from a time moment of turning on the camera to a time moment of starting to record the video; and
   add the first video to the recorded video.

14. The image acquisition device of claim 10, wherein the preset composition model comprises at least one of: a first composition model formed based on composition principles, and a second composition model trained based on preset composition samples.

15. The image acquisition device of claim 10, wherein the processor is further configured to:
   acquire voice data collected by an audio collector in the electronic device; and
   trigger the preview image acquisition in response to determining that keywords of the voice data comprise preset keyword instructions.

16. The image acquisition device of claim 10, wherein the processor is further configured to:
   acquire a preview image collected by an instruction camera in the electronic device;
   acquire postures of a photographer in the preview image collected by the instruction camera; and
   trigger the preview image acquisition in response to determining that the postures of the photographer comprise preset postures.

17. The image acquisition device of claim 10, wherein the processor is further configured to:
   acquire a preview video stream collected by the instruction camera in the electronic device;
   track eyeballs of photographer in the preview video stream based on a preset eyeball tracking algorithm to obtain the eyeball postures of the photographer; and
   trigger the preview image acquisition in response to obtaining the eyeball postures.

18. The image acquisition device of claim 10, wherein the processor is further configured to:
   present a first preset interface configured to display the preview image in response to detecting a starting operation of the camera, wherein no operation key is displayed in the first preset interface; and
   stop a current photographing and close the first preset interface in response to detecting a control instruction characterizing the stop of photographing.

19. The image acquisition device of claim 10, wherein the processor is further configured to:
   display the target image in a second preset interface in response to detecting a browsing instruction characterizing the browsing of the target image;
   delete the currently displayed target image in response to detecting a deletion instruction characterizing the deletion of the target image; and
   display the next target image to be switched in response to detecting a switching instruction characterizing the switching of the target image.

20. A non-transitory storage medium having stored thereon executable instructions that when executed by a processor, implement an image acquisition method, the method comprising: acquiring a preview image collected by the camera;
   detecting a target area in the preview image based on a preset composition model, wherein the target area is an area focused by a photographer and the target area is smaller than the preview image; and
   in response to detecting the target area, acquiring an image comprising only the target area as a target image;
   the method further comprising:
   before detecting the target area in the preview image based on the preset composition model, acquiring spatial posture data collected by a spatial posture sensor in the electronic device;
   acquiring posture of the electronic device according to the spatial posture data, wherein the posture comprises a stationary state of the electronic device;
   in response to determining that duration of the posture exceeds a preset first duration threshold, executing the step of detecting the target area in the preview image based on the preset composition model; and
   in response to determining that the duration of the posture exceeds a preset second duration threshold, recording a video.

* * * * *